(12) United States Patent
Lee et al.

(10) Patent No.: US 12,081,491 B2
(45) Date of Patent: Sep. 3, 2024

(54) METHOD AND DEVICE FOR REPORTING DEVICE-TO-DEVICE CHANNEL STATE TO BASE STATION IN NR V2X

(71) Applicant: LG Electronics Inc., Seoul (KR)

(72) Inventors: Jongyoul Lee, Seoul (KR); Giwon Park, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 388 days.

(21) Appl. No.: 17/440,899

(22) PCT Filed: Mar. 23, 2020

(86) PCT No.: PCT/KR2020/003925
§ 371 (c)(1),
(2) Date: Sep. 20, 2021

(87) PCT Pub. No.: WO2020/190106
PCT Pub. Date: Sep. 24, 2020

(65) Prior Publication Data
US 2022/0158804 A1     May 19, 2022

(30) Foreign Application Priority Data

Mar. 21, 2019  (KR) ........................ 10-2019-0032359

(51) Int. Cl.
*H04L 5/00* (2006.01)
*H04W 24/10* (2009.01)

(52) U.S. Cl.
CPC .......... *H04L 5/0057* (2013.01); *H04L 5/0051* (2013.01); *H04W 24/10* (2013.01)

(58) Field of Classification Search
CPC ..... H04W 24/10; H04L 5/0057; H04L 5/0051
See application file for complete search history.

(56) References Cited

U.S. PATENT DOCUMENTS

| | | | |
|---|---|---|---|
| 2018/0270807 A1* | 9/2018 | Salem | H04W 72/0446 |
| 2018/0317066 A1* | 11/2018 | Xu | H04W 40/02 |
| 2019/0364590 A1* | 11/2019 | Sartori | H04W 72/23 |
| 2022/0014338 A1* | 1/2022 | Yoshioka | H04W 8/005 |
| 2022/0086855 A1* | 3/2022 | Mallick | H04W 72/1215 |

(Continued)

FOREIGN PATENT DOCUMENTS

KR    20200035836 A  *  4/2020  ........... H04B 17/318

OTHER PUBLICATIONS

English Translation of KR-20200035836A; retrieved from the Internet Dec. 6, 2023 (InnovationQ+ IP.com) (Year: 2023).*

(Continued)

*Primary Examiner* — Benjamin H Elliott, IV
(74) *Attorney, Agent, or Firm* — BRYAN CAVE LEIGHTON PAISNER LLP

(57) ABSTRACT

Presented is an operation method of a first device in a wireless communication system. The method can comprise the steps of: receiving configuration information related to the measurement of a channel state from a base station; transmitting the configuration information to a second device; receiving, from the second device, a measurement result related to the channel state; and reporting, to the base station, the measurement result related to the channel state.

10 Claims, 25 Drawing Sheets

(56) References Cited

U.S. PATENT DOCUMENTS

2022/0110067 A1* 4/2022 Ryu ................... H04W 24/08
2022/0158804 A1* 5/2022 Lee .................... H04W 4/40

OTHER PUBLICATIONS

"Applying Multiradio Access Technologies for Reliability Enhancement in Vehicle-to-Everything Communication"; Liangchi et al.; IEEE Access vol. 6, Apr. 23, 2018 (Year: 2018).*
English Translation of PCT/KR2020/003925; retrieved from the Internet Dec. 6, 2023; date of publication Jun. 29, 2020 (Year: 2023).*
Fujitsu. Efficient Sidelink CSI Feedback Mechanism for Groupcast NR-V2X. RI-1810592. 3GPP TSG RAN WG1 #94bis. Chengdu, China. Sep. 28, 2018, pp. 1-6.
CATT. Sidelink SR/BSR in Uu Interface. R2-1900219. 3GPP TSG RAN WG2 #105. Athens, Greece. Feb. 15, 2019, pp. 1-5.
Huawei et al. Support for sidelink unicast, groupcast and broadcast RI-1810137. 3GPP TSG RAN WG1 #94bis. Chengdu, China. Sep. 29, 2018. pp. 1-9.
ITRI. Sidelink Physical Procedures for NR V2X. RI-190240 3GPP TSG RAN WG1 #96. Athens, Greece. Feb. 15, 2019, pp. 1-5.
Fraunhofer Hhi et al. Sidelink Design for Unicast and Groupcast. R1-1810483. 3GPP TSG RAN WG1 #94bis. Chengdu, China. Sep. 28, 2018, pp. 1-6.
ITRI. Sidelink Physical Procedures for NR V2X. RI-1902401 3GPP TSG RAN WG1 #96. Athens, Greece. Feb. 15, 2019, pp. 1-5.

* cited by examiner (a)

(b)

(a)

(b)

METHOD AND DEVICE FOR REPORTING DEVICE-TO-DEVICE CHANNEL STATE TO BASE STATION IN NR V2X

This application is a National Stage filing under 35 U.S.C. 371 of International Application No. PCT/KR2020/003925, filed on Mar. 23, 2020, which claims the benefit of Korean Patent Application No. 10-2019-0032359, filed on Mar. 21, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Solutions

According to an embodiment, a method of operating a first apparatus in a wireless communication system is proposed. The method may include receiving configuration information related to measurement of the channel state from a base station; transmitting the configuration information to a second apparatus; receiving, from the second apparatus, the measurement result related to the channel state; and reporting the measurement result related to the channel state to the base station.

Effects of the Disclosure

The UE can efficiently perform sidelink communication.

DESCRIPTION OF EXEMPLARY EMBODIMENTS

Figure 1:
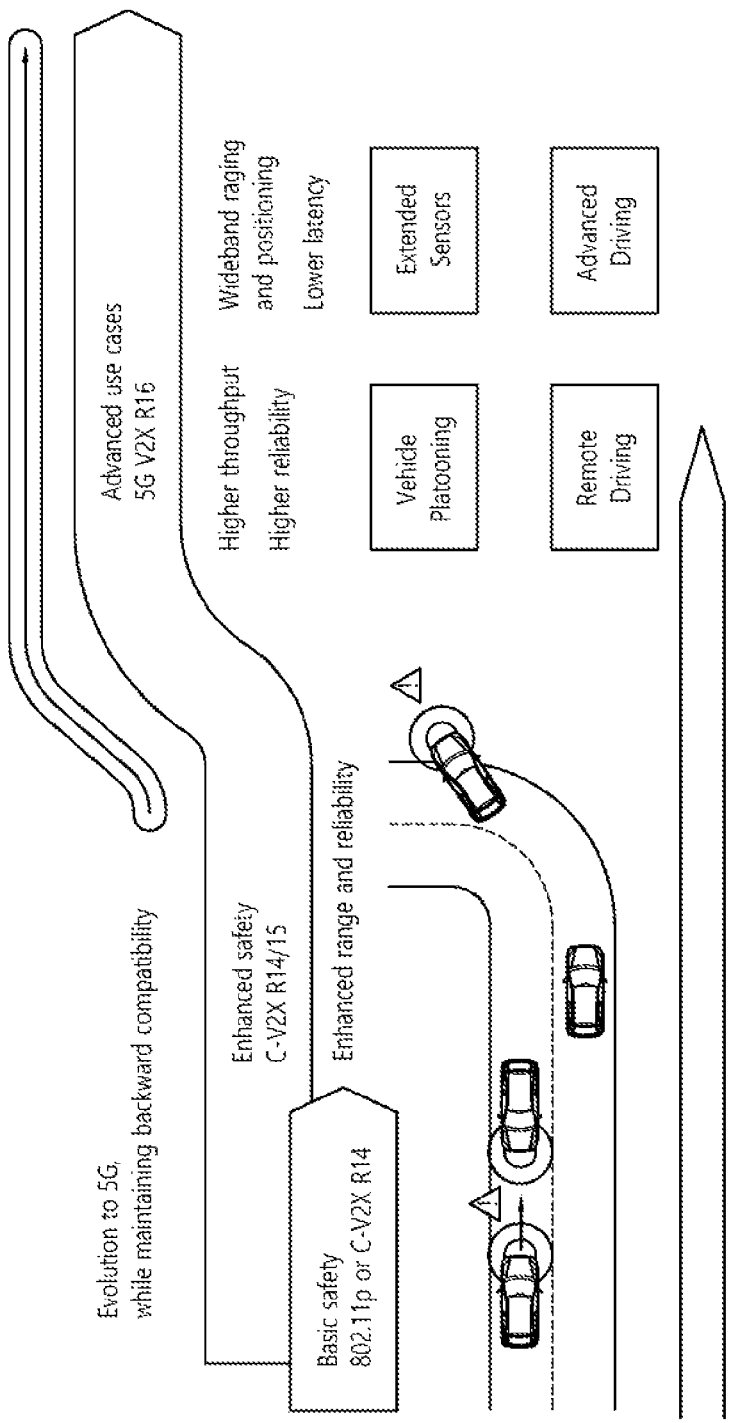
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
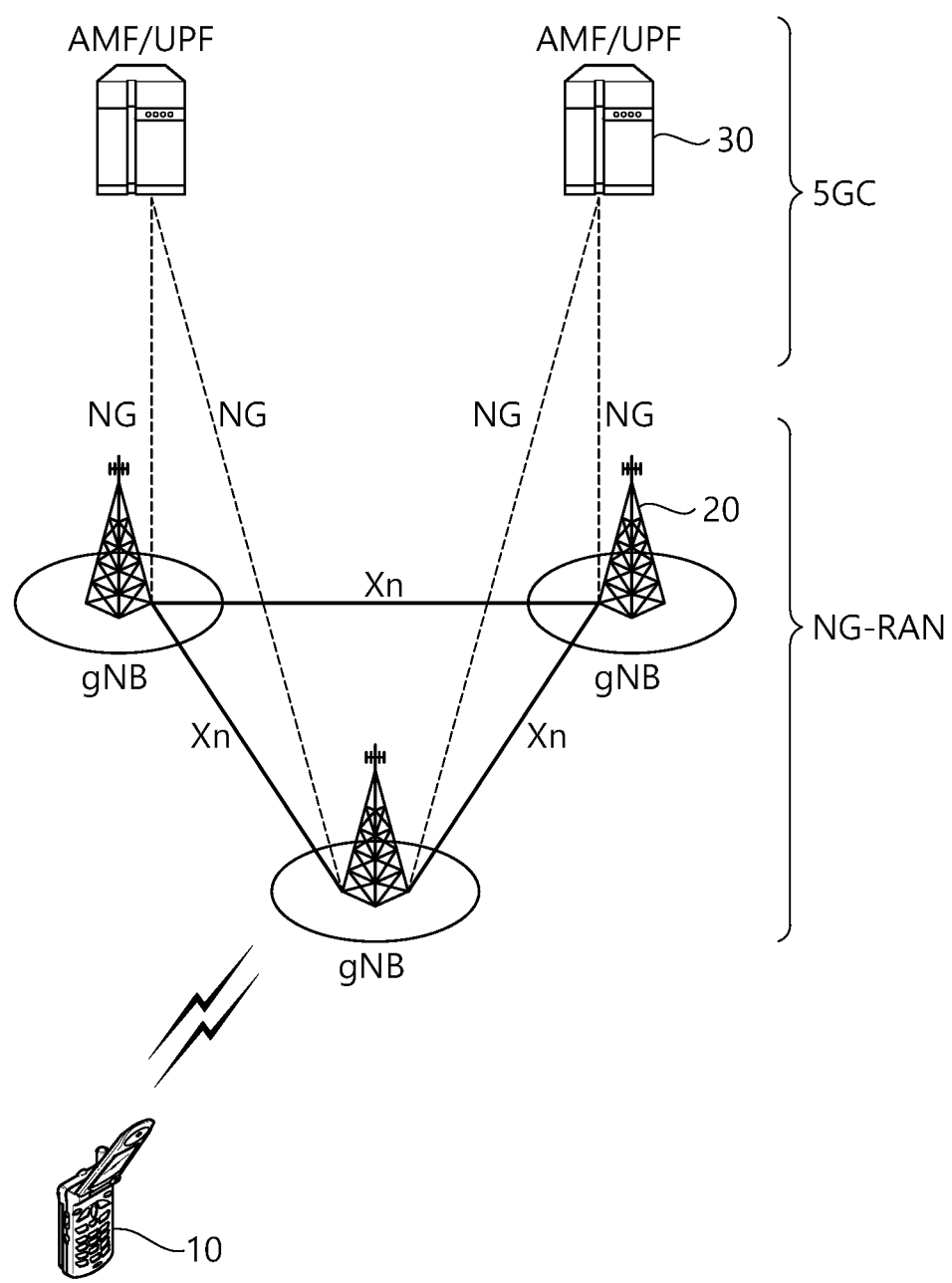
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
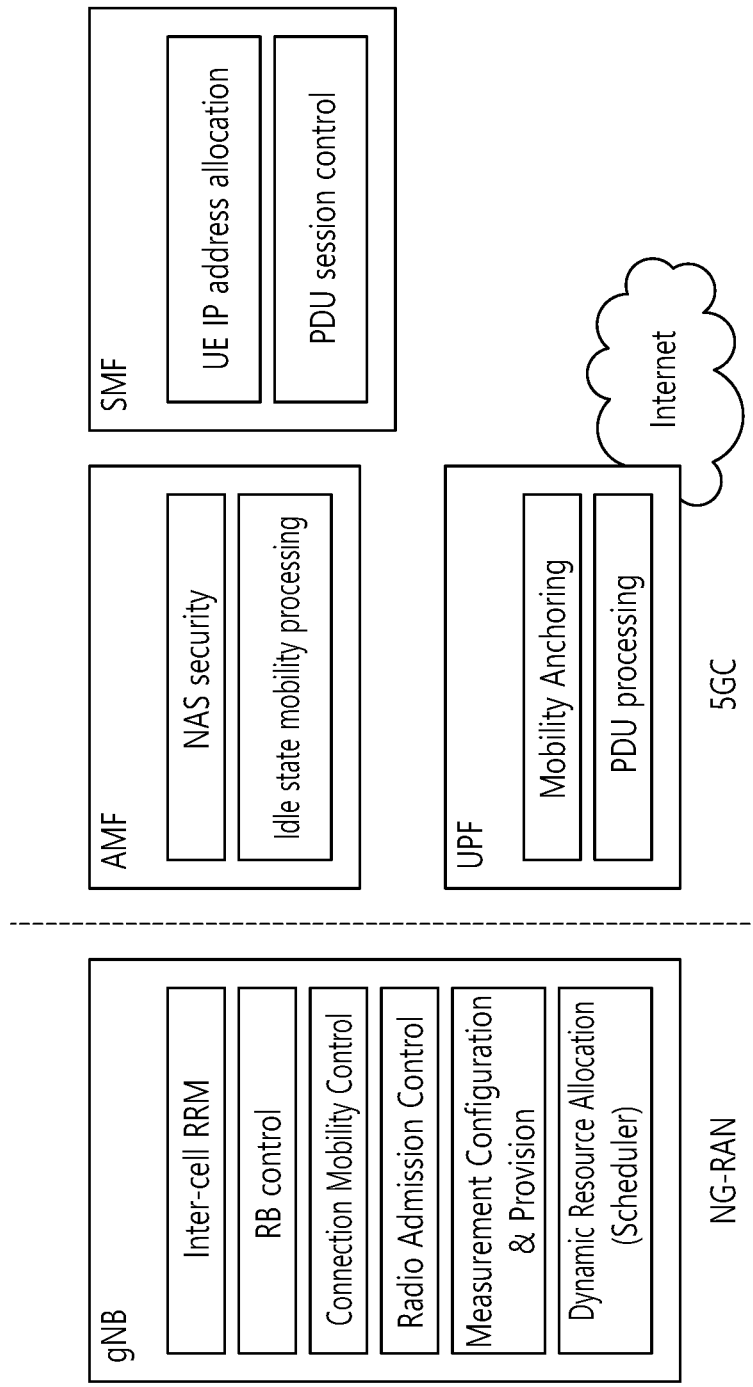
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
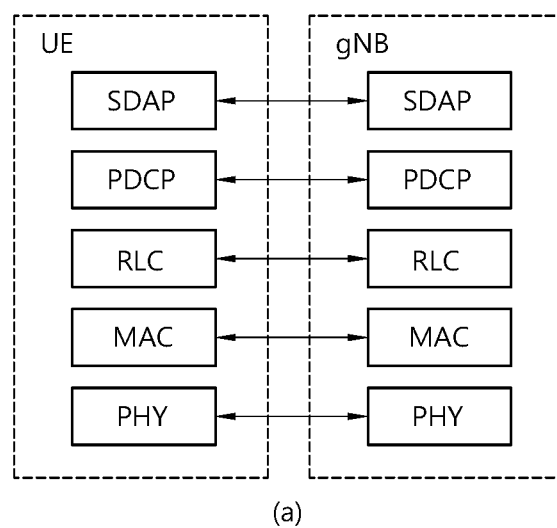
FIG. 4 shows a radio protocol architecture, in accordance with an embodiment of the present disclosure.
Figure 4:
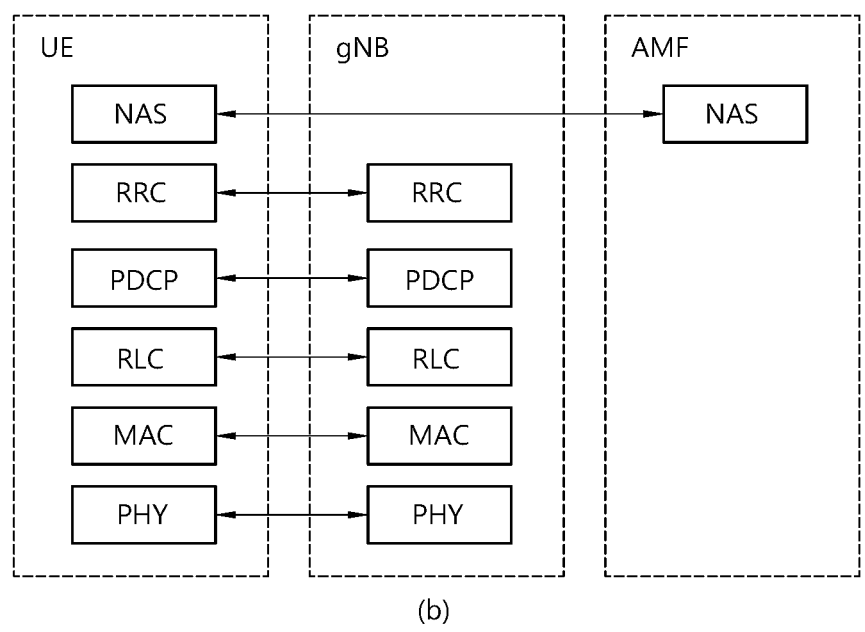

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
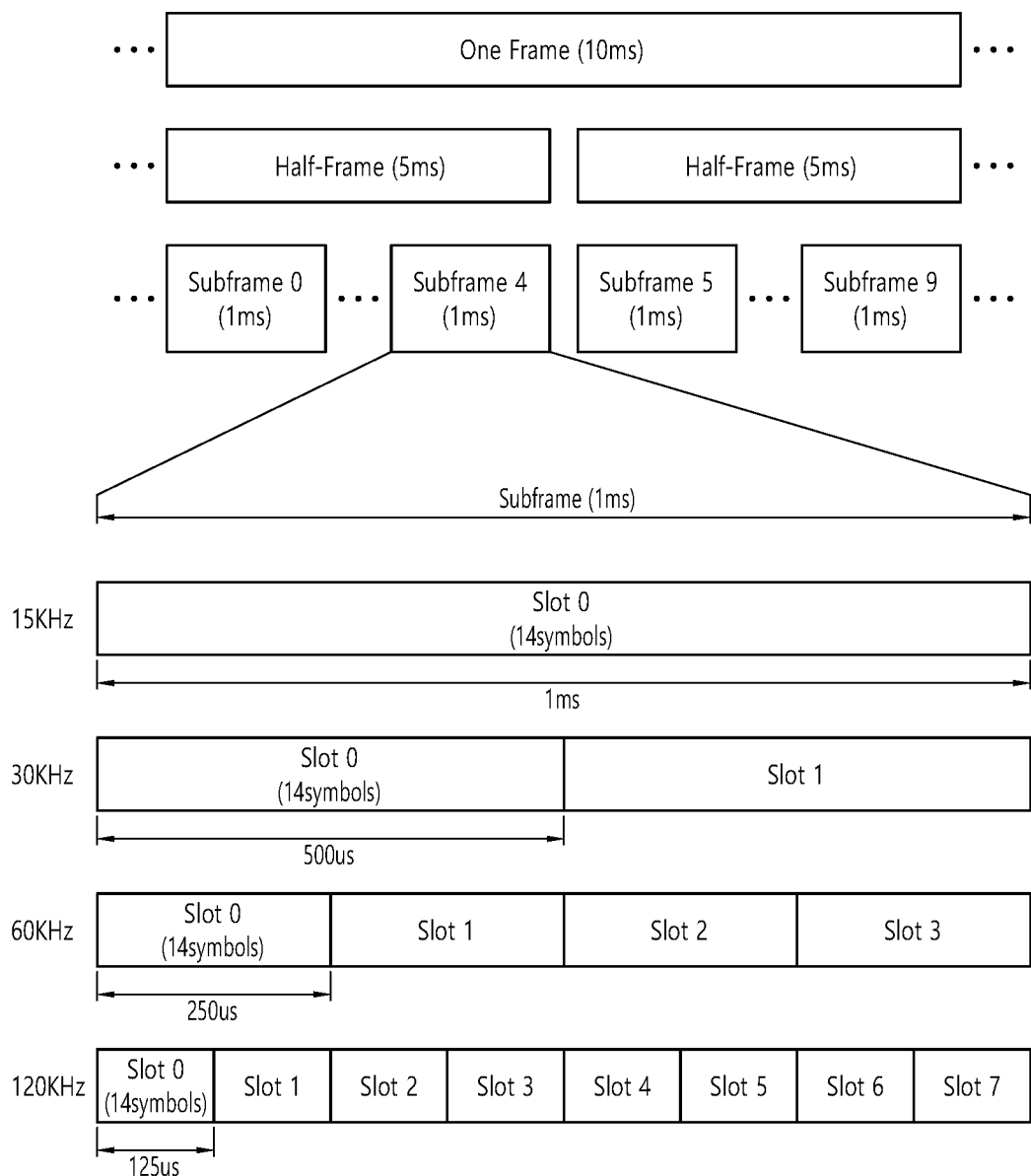
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15*2$^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*2$^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR 1 | 450 MHz-6000 MHz | 15, 30, 60 kHz |
| FR 2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR 1 | 410 MHz-7125 MHz | 15, 30, 60 kHz |
| FR 2 | 24250 MHz-52600 MHz | 60, 120, 240 kHz |

Figure 6:
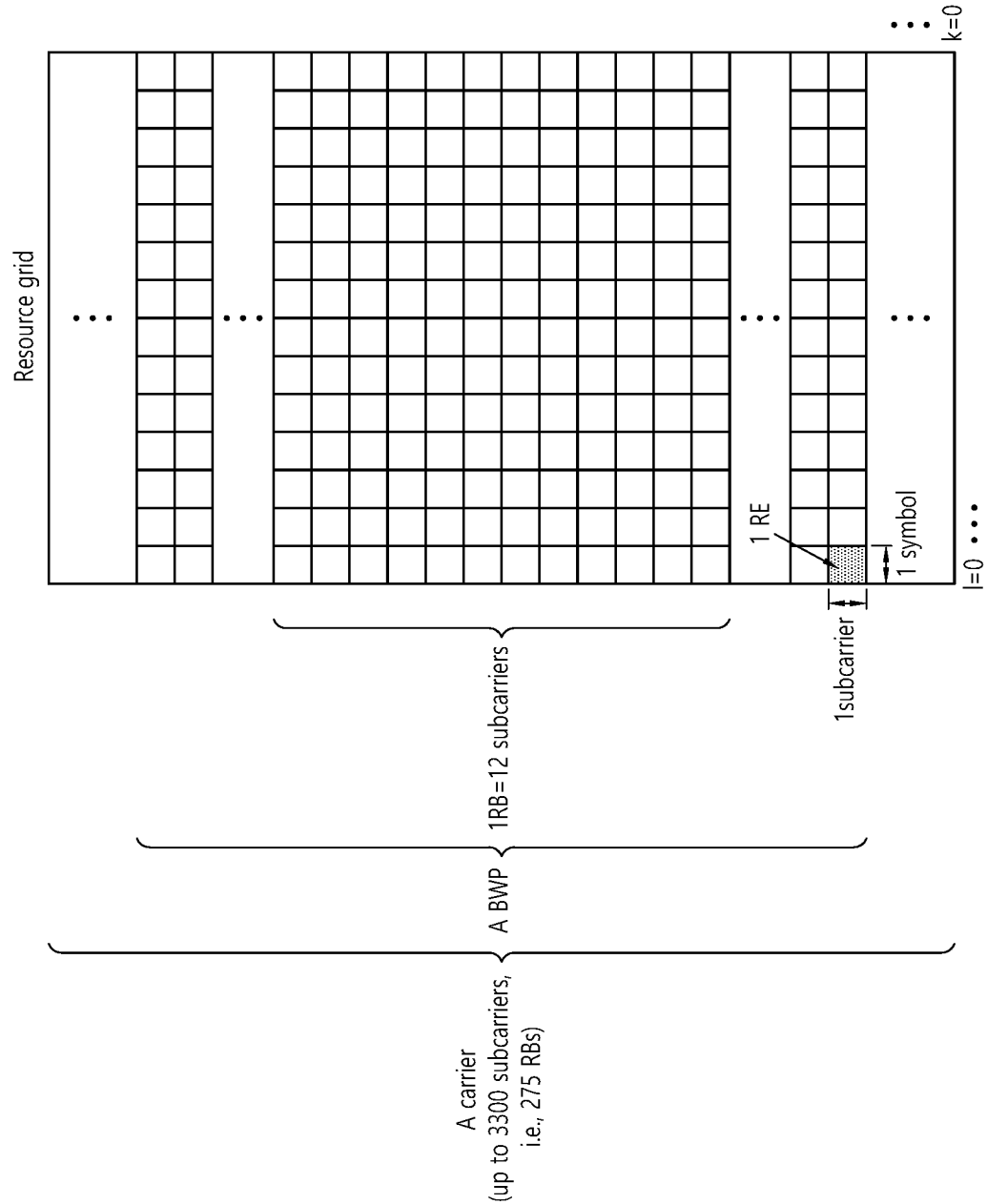
FIG. 6 shows a structure of a slot of an NR frame, in accordance with an embodiment of the present disclosure.

FIG. 6 shows a structure of a slot of an NR frame, in accordance with an embodiment of the present disclosure. The embodiment of FIG. 6 may be combined with various embodiments of the present disclosure. Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
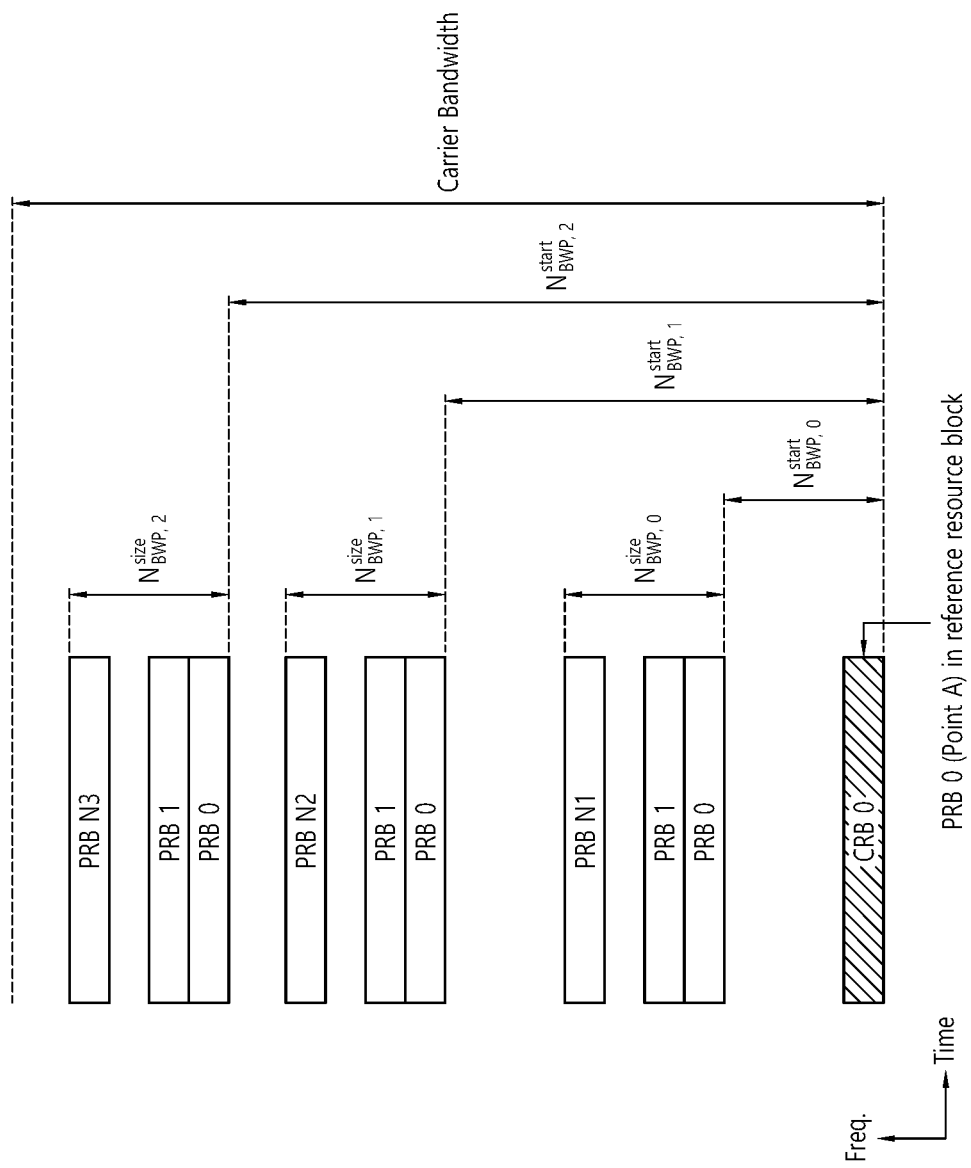
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8:
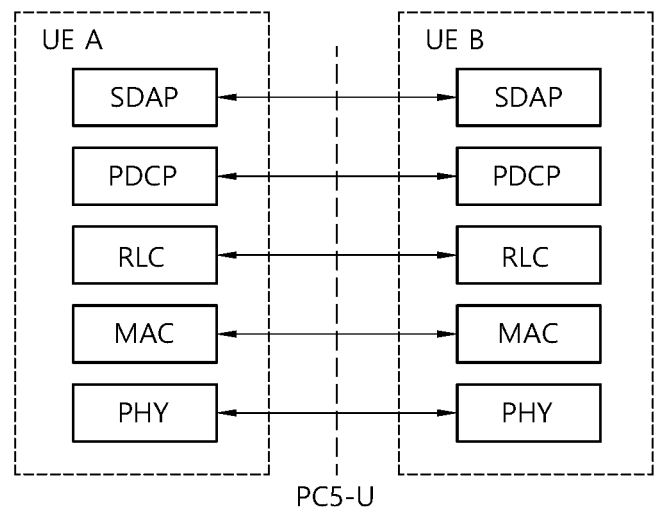
FIG. 8 shows a radio protocol architecture for a SL communication, in accordance with an embodiment of the present disclosure.
Figure 8:
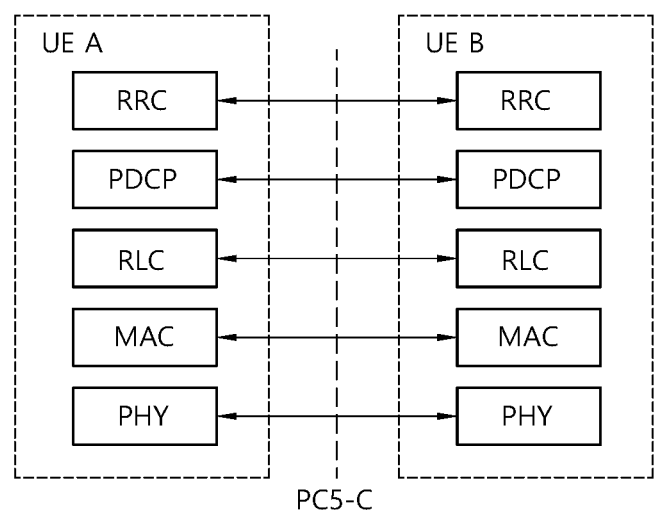

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
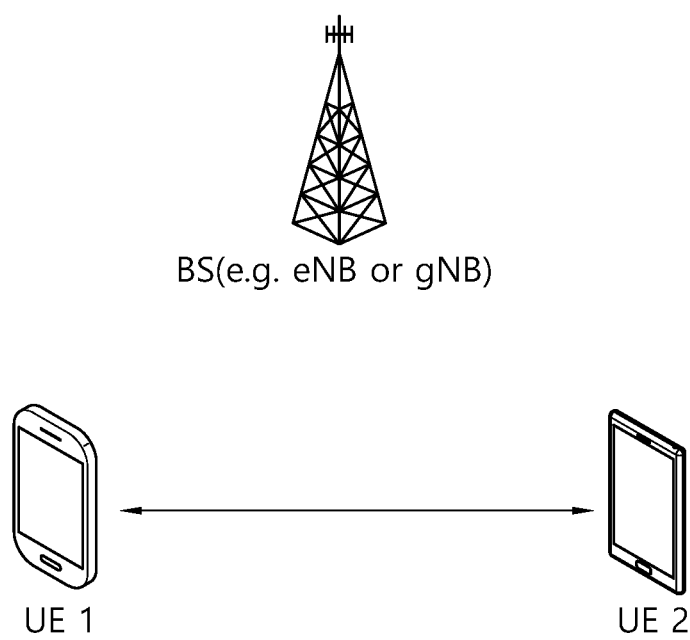
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
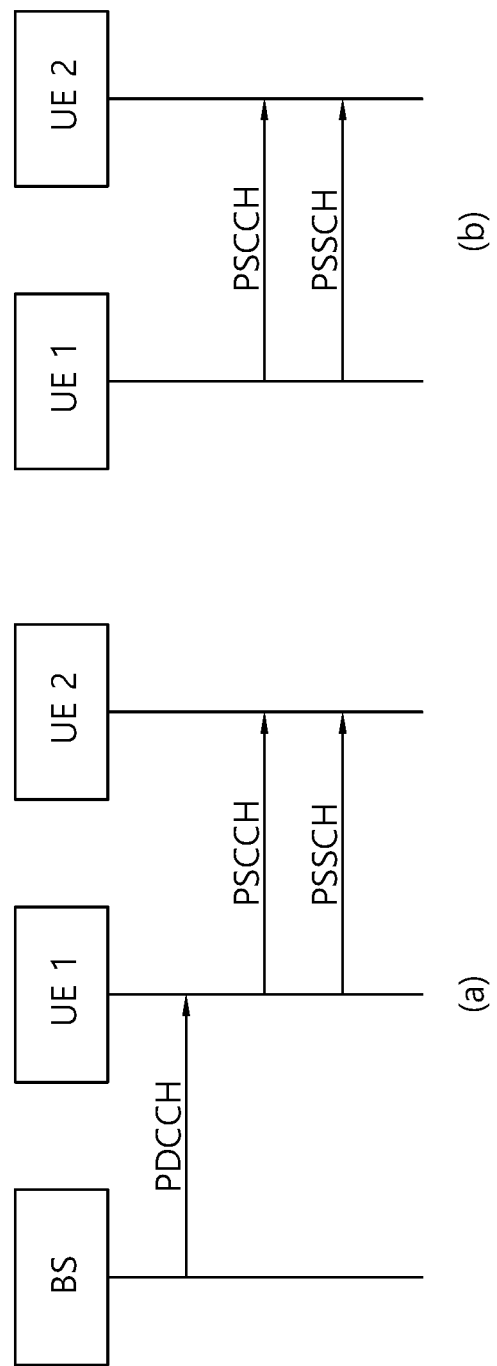
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
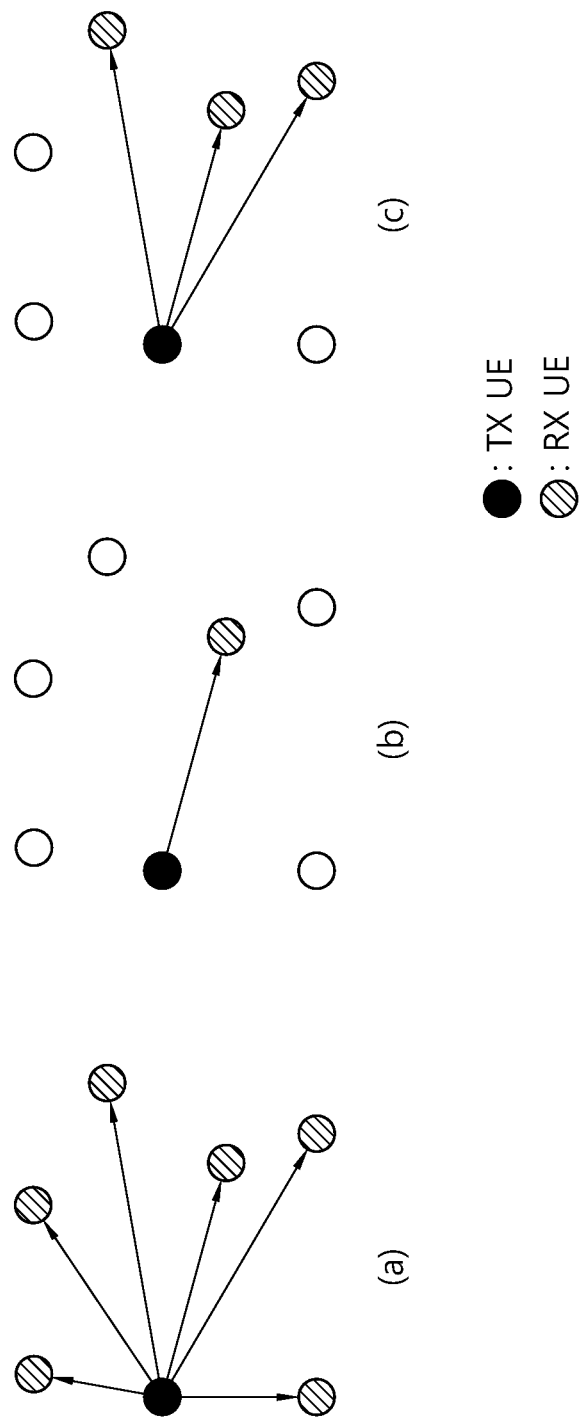
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, SL measurement and reporting will be described.

For the purpose of QoS prediction, initial transmission parameter setting, link adaptation, link management, admission control, or the like, SL measurement and reporting (e.g., RSRP, RSRQ) between UEs may be considered in SL. For example, a receiving UE may receive a reference signal from a transmitting UE, and the receiving UE may measure a channel state for the transmitting UE based on the reference signal. In addition, the receiving UE may report channel state information (CSI) to the transmitting UE. SL-related measurement and reporting may include measurement and reporting of CBR and reporting of location information. Examples of channel status information (CSI) for V2X may include a channel quality indicator (CQI), a precoding matrix index (PM), a rank indicator (RI), reference signal received power (RSRP), reference signal received quality (RSRQ), pathgain/pathloss, a sounding reference symbol (SRS) resource indicator (SRI), a SRI-RS resource indicator (CRI), an interference condition, a vehicle motion, or the like. In case of unicast communication, CQI, RI, and PMI or some of them may be supported in a non-subband-based aperiodic CSI report under the assumption of four or less antenna ports. A CSI procedure may not be dependent on a standalone reference signal (RS). A CSI report may be activated or deactivated based on a configuration.

For example, the transmitting UE may transmit CSI-RS to the receiving UE, and the receiving UE may measure CQI or RI based on the CSI-RS. For example, the CSI-RS may be referred to as SL CSI-RS. For example, the CSI-RS may be confined within PSSCH transmission. For example, the transmitting UE may perform transmission to the receiving UE by including the CSI-RS on the PSSCH.

Meanwhile, in a next generation system, various usage cases may be supported. For example, services for communication of self-driving vehicles, smart cars or connected cars, and so on, may be considered. For such services, each vehicle may receive and send (or transmit) information as a user equipment capable of performing communication. And, depending upon the circumstances, each vehicle may select resources for communication with the help (or assistance) of the base station or without any help (or assistance) of the base station and transmit and receive messages to and from other UEs.

Meanwhile, in NR V2X, an inter-UE channel measurement/reporting mechanism based on a sidelink may be supported. For example, a channel measurement result between UEs may be used to perform link management of an access stratum (AS) layer, perform measurement-based quality of service (QoS) prediction, or link adaptation between UEs. On Uu interface, a base station may transmit configuration information to a UE so that the UE periodically or aperiodically performs channel measurement/reporting between the base station and the UE. For example, the UE may measure a channel state using a reference signal (RS) transmitted by the base station and report the result to the base station. As in the case of the Uu interface, in a sidelink communication environment, channel measurement/reporting between UEs may be performed. For example, a measurement result related to a channel state between UEs performed in a sidelink communication environment may be reported by the UE to the base station. The base station may perform a resource management operation based on the measurement result received from the UE. For example, the resource management operation may include allocating, by the base station, a radio resource related to sidelink communication to the UE based on a measurement result related to a channel state. For example, in a channel measurement/reporting process between UEs on sidelink communication, a sidelink-specific channel measurement/reporting mechanism that is distinct from the Uu interface may be required. For example, the channel measurement/reporting mechanism may include channel state information (CSI) reporting. In the present disclosure, it is proposed that a sidelink-specific channel measurement/reporting mechanism is required, and a medium access control (MAC) control element (CE) format in consideration of sidelink characteristics is proposed. For example, the MAC CE format may be used to report a measurement result related to a channel state.

In a channel state measurement/reporting process in Uu interface, a base station may transmit measurement-related configuration information to a UE. For example, in the channel state measurement/reporting process on the Uu interface, the base station may tightly control the channel state measurement/reporting by transmitting configuration information related to channel state measurement to the UE. Specifically, the UE may perform channel measurement for a purpose different from radio resource management (RRM). In this case, the UE may measure the state of a channel related to one cell. For example, the measurement result related to the channel measurement may include a reference signal received power (L1-RSRP), a precoding matrix indicator (PMI), a rank indicator (RI), and the like. In this case, the UE may report the measurement result to the base station through uplink communication. For example, the measurement result may include CSI. For example, if the base station needs to tightly control the channel state related to the cell, the UE may report the channel state through uplink control information (UCI) with a small overhead.

On the other hand, for example, in sidelink communication, unlike the channel state measurement/reporting process in the Uu interface, a base station may relatively loosely manage the measurement/reporting of the channel state between UEs. For example, the base station may perform resource management based on a long-term measured channel state and/or radio parameter management based on a long-term measured channel state through loose management.

For example, since sidelink communication supports groupcast communication and broadcast communication, it is possible to establish a connection with two or more second UEs from the viewpoint of one first UE. For example, when the first UE performs groupcast communication, the first UE may communicate with a plurality of second UEs. In this case, for example, communication between the first UE and each of the second UEs may be unicast communication. Accordingly, reporting of the measurement result related to the channel state on the sidelink communication may require more overhead than the reporting of the measurement result related to the channel state on the Uu interface.

According to an embodiment of the present disclosure, when a base station loosely controls a measurement/reporting of the channel state related to a first UE performing sidelink communication, the first UE may report a measurement result related to a connection with which second UE the measurement result reported to the base station is, while reporting the measurement result related to the channel state. For example, the first UE may report information related to the measurement result to the base station together with the measurement result. The information related to the measurement result may include a type of information related to the channel state included in the measurement result. For example, the type of information related to the channel state may be indicated through a bitmap.

According to an embodiment of the present disclosure, in a case that a base station strictly controls measurement/reporting of a channel state related to a first UE performing sidelink communication, and in a case that the base station loosely controls the measurement/reporting of the channel state related to the first UE performing sidelink communication, information to be reported by the first UE to the base station is proposed. In addition, in relation to measurement/reporting of a channel related to sidelink communication performed by the first UE, a parameter configured by the base station to the first UE is proposed.

For example, here, a first UE may establish a connection based on sidelink communication with a plurality of second UEs. For example, the first UE may perform multicast communication with a plurality of second UEs. For example, when the first UE performs multicast communication with a plurality of second UEs, the first UE may report a channel state related to each connection with a plurality of second UEs to the base station. For example, the report of the channel state may include a measurement result related to the channel state. For example, the measurement result related to the channel state may include CSI related to the each connection. For example, the report of the measurement result related to the channel state may include a CSI report.

Figure 12:
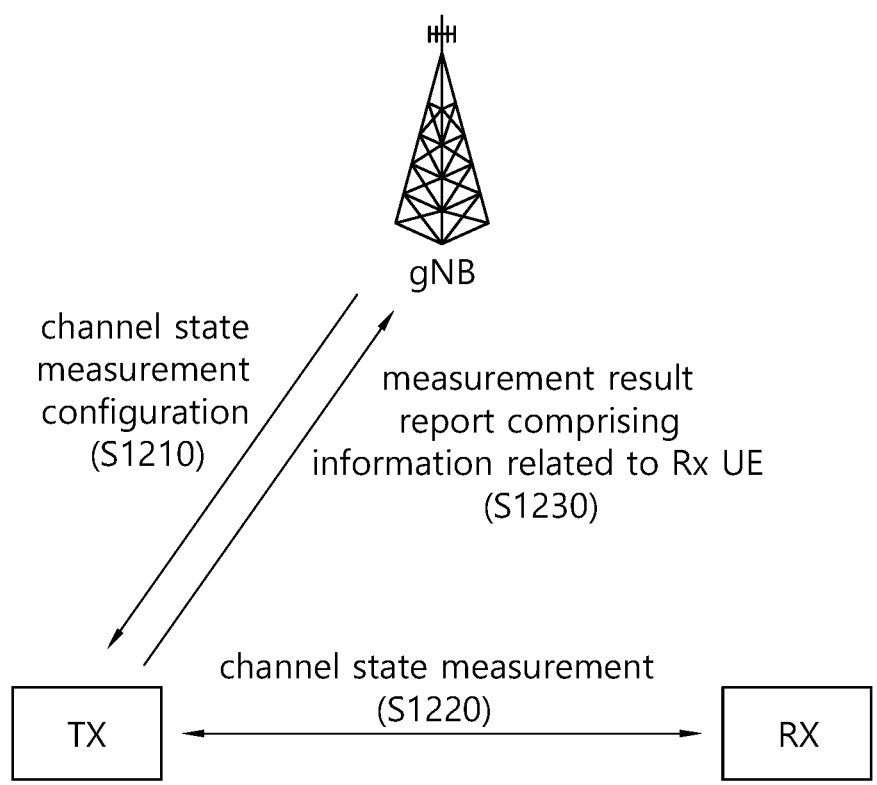
FIG. 12 shows a procedure for a base station to loosely control a channel state related to sidelink communication of a first UE in accordance with an embodiment of the present disclosure.

FIG. 12 shows a procedure for a base station to loosely control a channel state related to sidelink communication of a first UE in accordance with an embodiment of the present disclosure. The embodiment of FIG. 12 may be combined with various embodiments of the present disclosure.

Referring to FIG. 12, in step S1210, a base station may transmit configuration information related to measurement of a channel state to a first UE. For example, the base station may transmit a measurement configuration related to the channel state to the first UE. For example, the channel state may include a channel state related to sidelink communication of the first UE. For example, the configuration information related to the measurement of the channel state may include a period of channel measurement/reporting. For example, the measurement of the channel state may be triggered based on an event. For example, the configuration information related to the measurement of the channel state may include information related to an event triggering the measurement of the channel state. The configuration information related to the measurement of the channel state may include information related to a type of a reference signal (RS) and/or a type of channel state measurement/reporting. For example, the type of channel state measurement/reporting may include periodic measurement/reporting and/or aperiodic measurement/reporting.

In step S1220, a first UE may measure a channel state related to sidelink communication between the first UE and a second UE. For example, a measurement result related to the channel state may be transmitted from the second UE to the first UE. For example, the first UE may measure the channel state based on the configuration information received from a base station.

In step S1230, the first UE may report the measurement result related to the sidelink communication between the first UE and the second UE to the base station. For example, the measurement result may include a measurement result of a channel state related to the sidelink communication. For example, the measurement result may be reported through MAC CE. For example, the measurement result may include information related to the second UE. The information related to the second UE may include a destination identifier (ID) related to the second UE. For example, the first UE may map the measurement result reported by the first UE to the base station to information related to the second UE. For example, the first UE may include the destination ID related to the second UE in a MAC CE related to the reporting of the measurement result. For example, the MAC CE may be included in a MAC protocol data unit (PDU). For example, the MAC CE may be a MAC CE for CSI reporting. For example, the first UE may include the destination ID related to the second UE in a subheader of the MAC CE included in the MAC PDU related to the reporting of the measurement result.

For example, a measurement result reported by the first UE to a base station may include a bit map. For example, the bitmap may be included in a MAC CE for CSI reporting. For example, the bitmap may indicate the type of channel state-related information included in the measurement result reported by the first UE to the base station. The type of information related to the channel state may include at least one of a channel quality indicator (CQI), a precoder matrix indicator (PCI), and/or a rank indicator (RI).

According to an embodiment of the present disclosure, a first UE may perform sidelink communication with a plurality of second UEs. For example, when a first UE performs sidelink communication with a plurality of second UEs, the first UE may report information related to a connection with each second UE to the base station at once. For example, the information related to the connection between the first UE and each of the second UEs may include a measurement result of a channel state related to the connection between the first UE and each of the second UEs. For example, when the first UE reports the measurement result of the channel state related to the connection between the first UE and each second UE to the base station, one MAC CE may be configured and reported. For example, the MAC CE may include a plurality of measurement results related to each channel state. For example, the MAC CE may include information related to each second UE performing sidelink communication with the first UE. For example, the information related to each of the second UEs may include a destination ID.

According to an embodiment of the present disclosure, a first UE may perform sidelink communication with a plurality of second UEs. For example, when a first UE performs sidelink communication with a plurality of second UEs, the first UE may report information related to a connection with each second UE to the base station. For example, when a first UE reports information related to a connection with each second UE to a base station, it may be reported through one MAC PDU. For example, the information related to the connection between the first UE and each of the second UEs may include a measurement result of a channel state related to the connection between the first UE and each of the second UEs. For example, when the first UE reports the measurement result of the channel state related to the connection between the first UE and each second UE to the base station, one MAC CE related to each connection may be configured and reported. For example, the MAC CE may include information related to one second UE and a measurement result of a channel state related to a connection between the first UE and the second UE. For example, the MAC CE may be included in a MAC PDU transmitted by the first UE to the base station.

Figure 13:
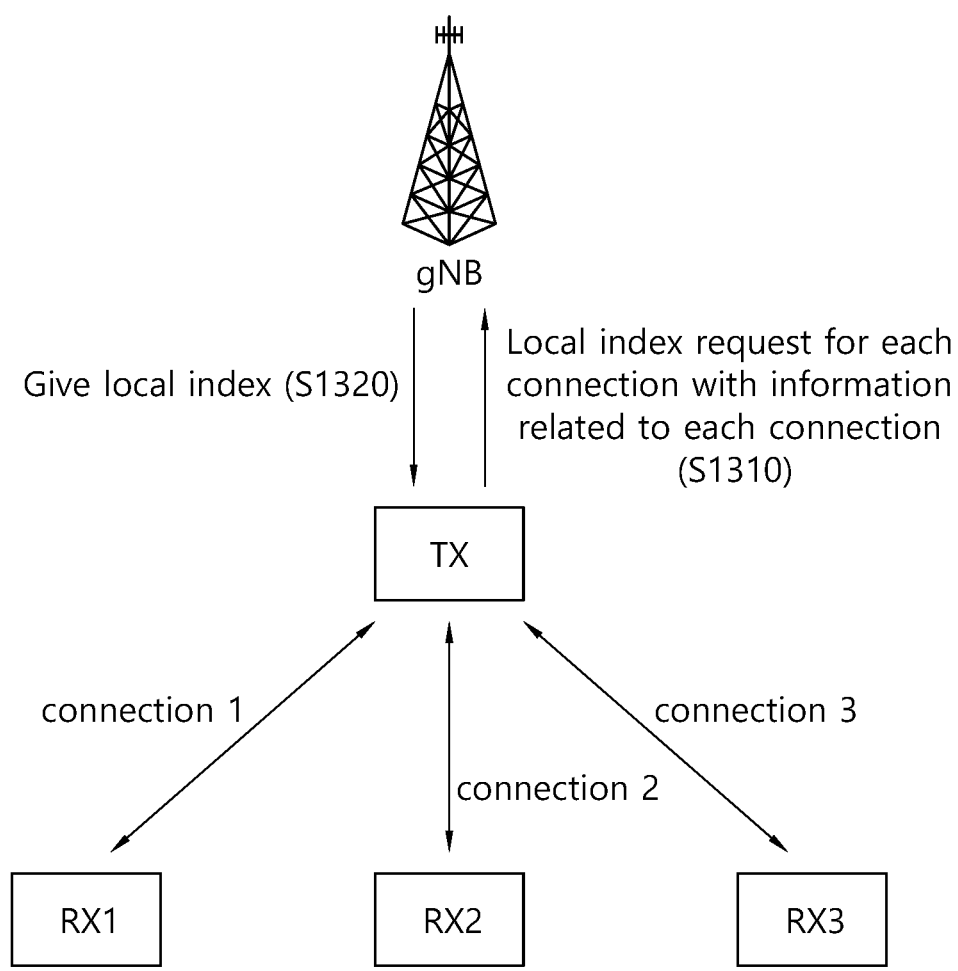
FIG. 13 shows a procedure in which a base station tightly controls a channel state related to sidelink communication of a first UE in accordance with an embodiment of the present disclosure.

FIG. 13 shows a procedure in which a base station tightly controls a channel state related to sidelink communication of a first UE in accordance with an embodiment of the present disclosure. The embodiment of FIG. 13 may be combined with various embodiments of the present disclosure.

Referring to FIG. 13, a first UE may perform sidelink communication with a plurality of second UEs. According to step S1310, the first UE may transmit information requesting a local index related to each second UE performing sidelink communication with the first UE to the base station. For example, the first UE may request a local index related to each second UE at once. For example, the information requesting the local index may include information related to a connection between the first UE and all of the second UEs. The information related to the connection between the first UE and each of the second UEs may include a source ID related to the first UE and/or a destination ID related to each of the second UEs.

According to step S1320, for example, the base station may assign a local index to a connection related to sidelink communication between the first UE and each second UE. For example, the base station may transmit the local index to the first UE. For example, the base station may map information related to the connection between the first UE and each second UE to the local index. For example, the base station may transmit configuration information related to the connection between the first UE and each of the second UEs to the first UE. For example, the configuration information related to the connection between the first UE and each second UE may include a type of information related to a channel state. The information related to the channel state may include at least one of a CQI, a PMI, and/or an RI. For example, the configuration information related to the connection between the first UE and each second UE may include a source ID related to the first UE and/or a destination ID related to the second UE.

Alternatively, for example, a first UE may report a measurement result of a channel state related to the first UE and a plurality of second UEs together with the local index to a base station. For example, the base station receiving the measurement result of the channel state related to the first UE and the plurality of second UEs together with the local index from the first UE may interpret the channel state related to the connection between the first UE and each second UE based on configuration information related to the interpretation of the measurement result. The configuration information related to the interpretation of the measurement result may be previously configured by the base station. For example, the configuration information related to the interpretation of the measurement result may include a type of information related to a channel state. The information related to the channel state may include at least one of a CQI, a PMI, and/or an RI. For example, the configuration information related to the interpretation of the measurement result may include a source ID related to the first UE and/or a destination ID related to the second UE.

According to an embodiment of the present disclosure described above, a base station may more strictly manage the channel state for each connection between a first UE and a plurality of second UEs performing sidelink communication. For example, when the first UE performs sidelink communication with a plurality of second UEs, a base station may flexibly manage the connection between the first UE and a specific second UE.

For example, the base station may transmit configuration information related to channel measurement of the connection to the first UE. For example, the configuration information may include a source ID related to the first UE and/or a destination ID related to the specific second UE. The configuration information may include a type of information related to a channel state that the first UE should report to the base station. The information related to the channel state may include at least one of a CQI, a PMI, and/or an RI. For example, the base station may request the first UE to report sidelink CSI related to the specific second UE.

In the above description, it is explained that when a first UE reports the measurement result related to a channel state of sidelink communication to a base station, a MAC CE related to a CSI report is included in a MAC PDU and transmitted. According to an embodiment of the present disclosure, a first UE may report the measurement result related to a channel state of the sidelink communication performed by the first UE to a base station through an RRC message. For example, when the first UE is in the RRC_CONNECTED state, the measurement result may be reported to the base station through an RRC message.

Hereinafter, a MAC PDU format that can be transmitted when a first UE performing sidelink communication reports a measurement result related to a channel state to a base station is proposed. For example, the first UE may report the measurement result related to the channel state to the base station by transmitting the MAC PDU to the base station. For example, the MAC PDU may include a MAC CE. The measurement result of the channel state related to the sidelink communication performed by the first UE may be included in the MAC CE. For example, the MAC PDU may include information related to a channel state, a measurement result related to the channel state, and/or ID of a UE. The ID of the UE may include a source ID and/or a destination ID. For example, the information related to the channel state may include at least one of a CQI, a PMI, and/or an RI.

Figure 14:
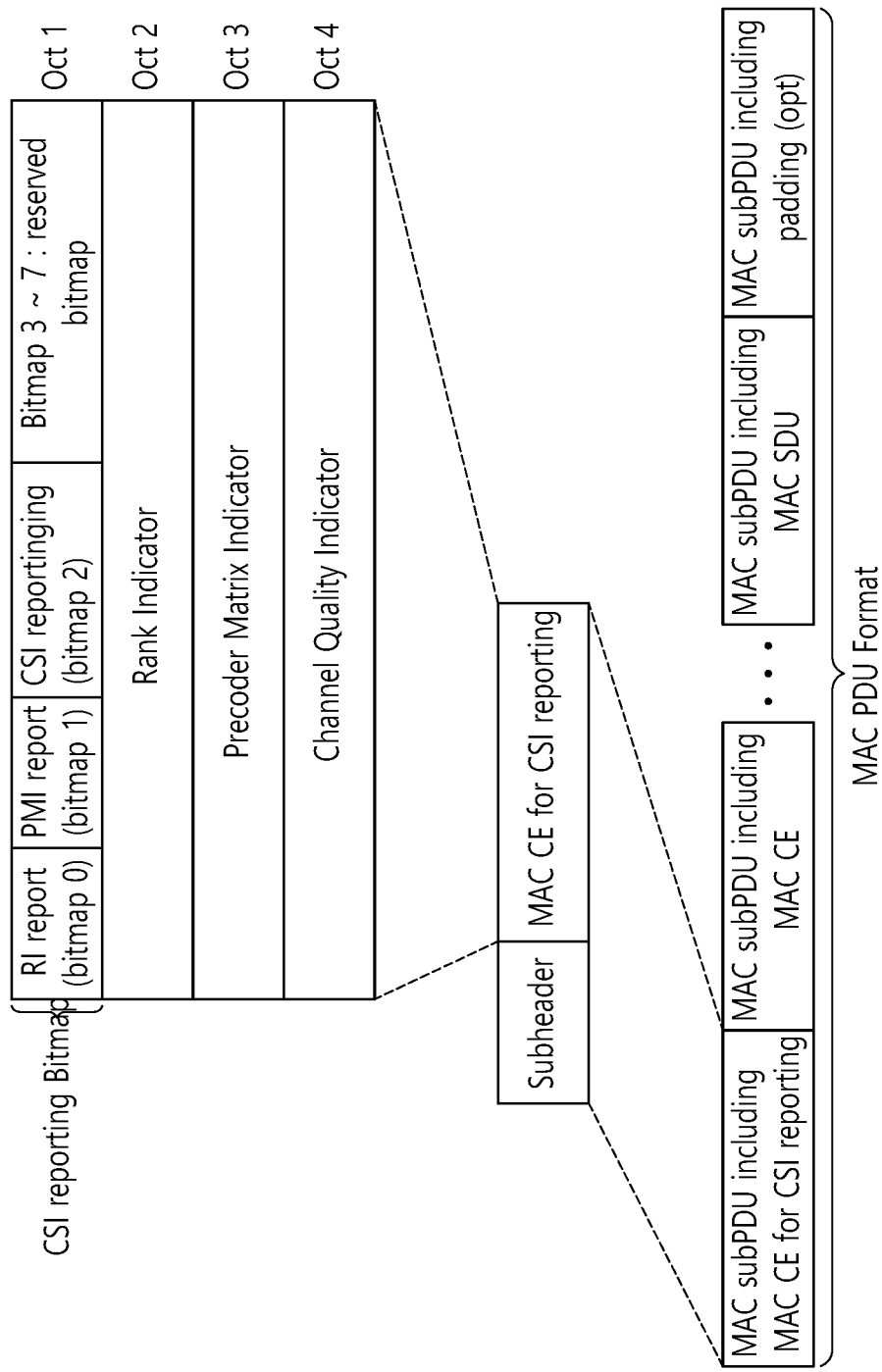
FIG. 14 shows a MAC PDU format for CSI reporting in accordance with an embodiment of the present disclosure.

FIG. 14 shows a MAC PDU format for CSI reporting in accordance with an embodiment of the present disclosure. The embodiment of FIG. 14 may be combined with various embodiments of the present disclosure.

Referring to FIG. 14, for example, a MAC sub PDU may include a subheader and a MAC CE for CSI reporting. The MAC PDU may include a plurality of MAC sub PDUs in addition to the sub PDU including the MAC CE for the CSI reporting. For example, the MAC CE for CSI reporting may include a bitmap indicating whether information related to a channel state is included in the MAC CE. For example, whether at least one or more of a CQI, a PMI, and/or an RI is included in the MAC CE may be indicated through the bitmap.

For example, a MAC CE for CSI reporting may include a measurement result related to a channel state of sidelink communication. For example, the measurement result related to the channel state may include at least one of a CQI, a PMI, and/or an RI. For example, the MAC CE for the CSI reporting may include information related to a second UE. The information related to the second UE may be included in a subheader of the MAC CE for the CSI reporting. For example, the information related to the second UE may include a destination ID related to a second UE performing sidelink communication with the first UE.

Figure 15:
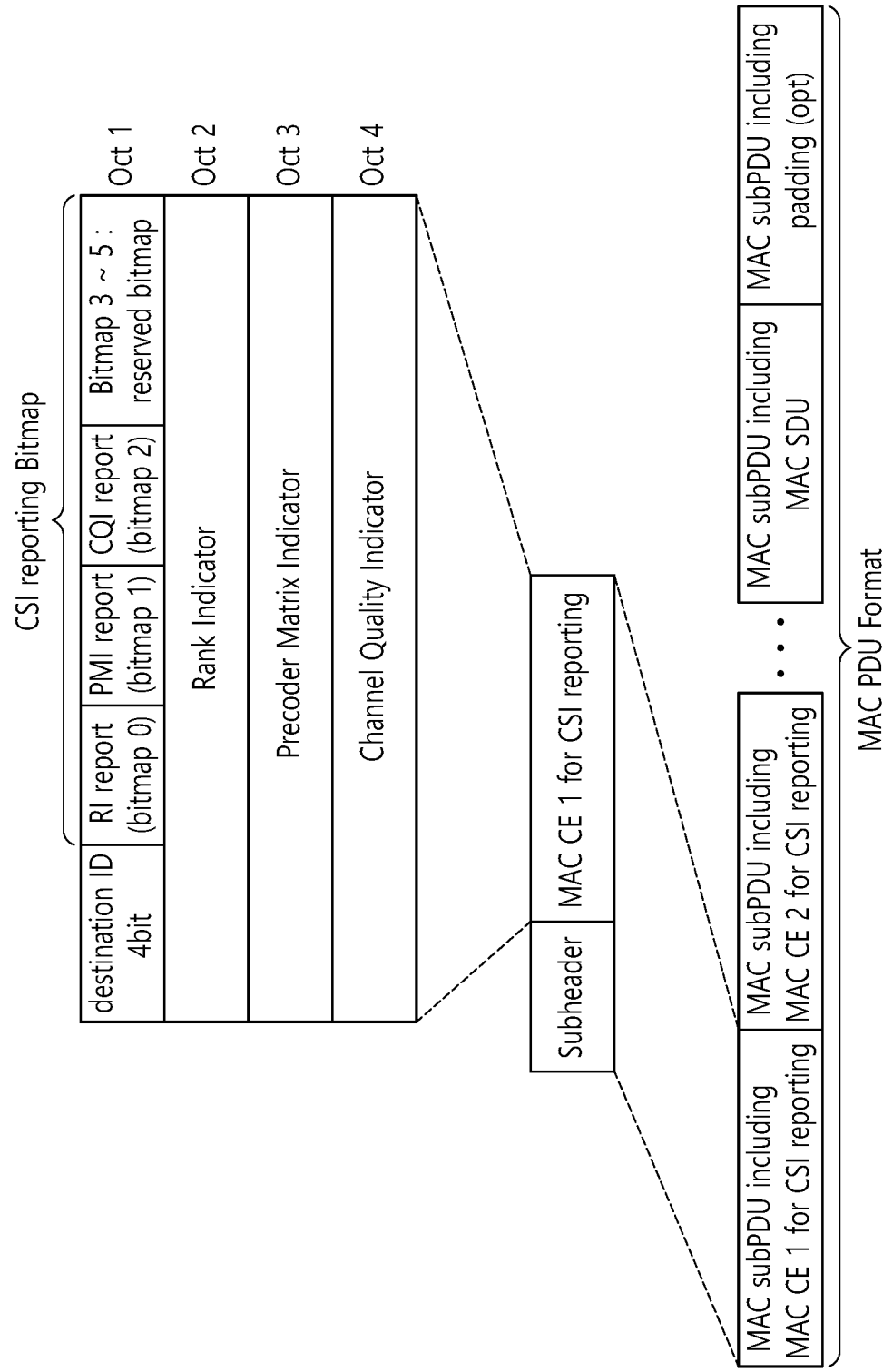
FIG. 15 shows a MAC PDU format for CSI reporting in accordance with an embodiment of the present disclosure.

FIG. 15 shows a MAC PDU format for CSI reporting in accordance with an embodiment of the present disclosure. The embodiment of FIG. 15 may be combined with various embodiments of the present disclosure.

Referring to FIG. 15, for example, a MAC CE for the CSI reporting may include information related to a second UE. For example, the information related to the second UE may include a destination ID related to the second UE. For example, the destination ID may be related to one second UE. For example, a MAC sub PDU including the MAC CE for CSI reporting may be related to one second UE performing sidelink communication with the first UE. The MAC CE for the CSI reporting may include a measurement result related to the one second UE performing sidelink communication with the first UE.

Figure 16:
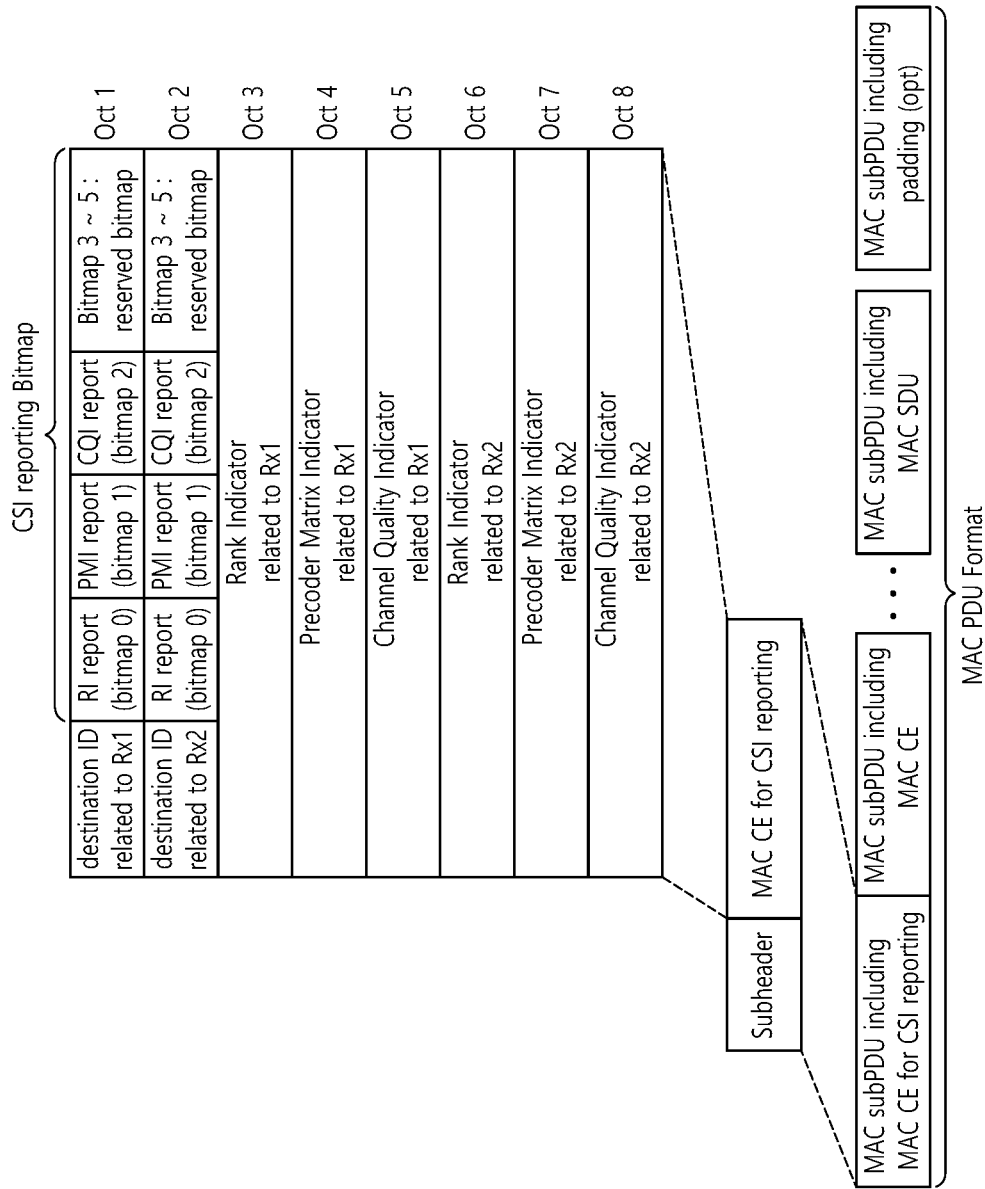
FIG. 16 shows a MAC PDU format for CSI reporting in accordance with an embodiment of the present disclosure.

FIG. 16 shows a MAC PDU format for CSI reporting in accordance with an embodiment of the present disclosure. The embodiment of FIG. 16 may be combined with various embodiments of the present disclosure.

Referring to FIG. 16, for example, a first UE may perform sidelink communication with a plurality of second UEs. For example, the first UE may report a measurement result related to a channel state between the first UE and a plurality of second UEs to the base station. In this case, the measurement result may include information related to the connection between the first UE and each of the second UEs. The information related to the connection between the first UE and each of the second UEs may include a destination ID related to each of the second UEs. For example, information related to the connection between the first UE and each of the second UEs may be included in the MAC CE for CSI reporting. For example, one MAC CE may include information related to a connection between the first UE and a plurality of second UEs. For example, the number of the plurality of second UEs may be two. For example, the destination ID related to each of the second UEs may be included in Oct1 and Oct2 of the MAC CE for the CSI reporting, respectively. For example, each of the bitmap indicating whether information related to the channel state between the first UE and each of the second UEs may be included in Oct1 and Oct 2 of the MAC CE for the CSI reporting. For example, each measurement result related to the channel state between the first UE and the plurality of second UEs may be included in Oct3 to Oct5 and Oct6 to Oct8 of the MAC CE for the CSI reporting, respectively. The measurement result may include at least one of a CQI, a PMI, and/or an RI.

Figure 17:
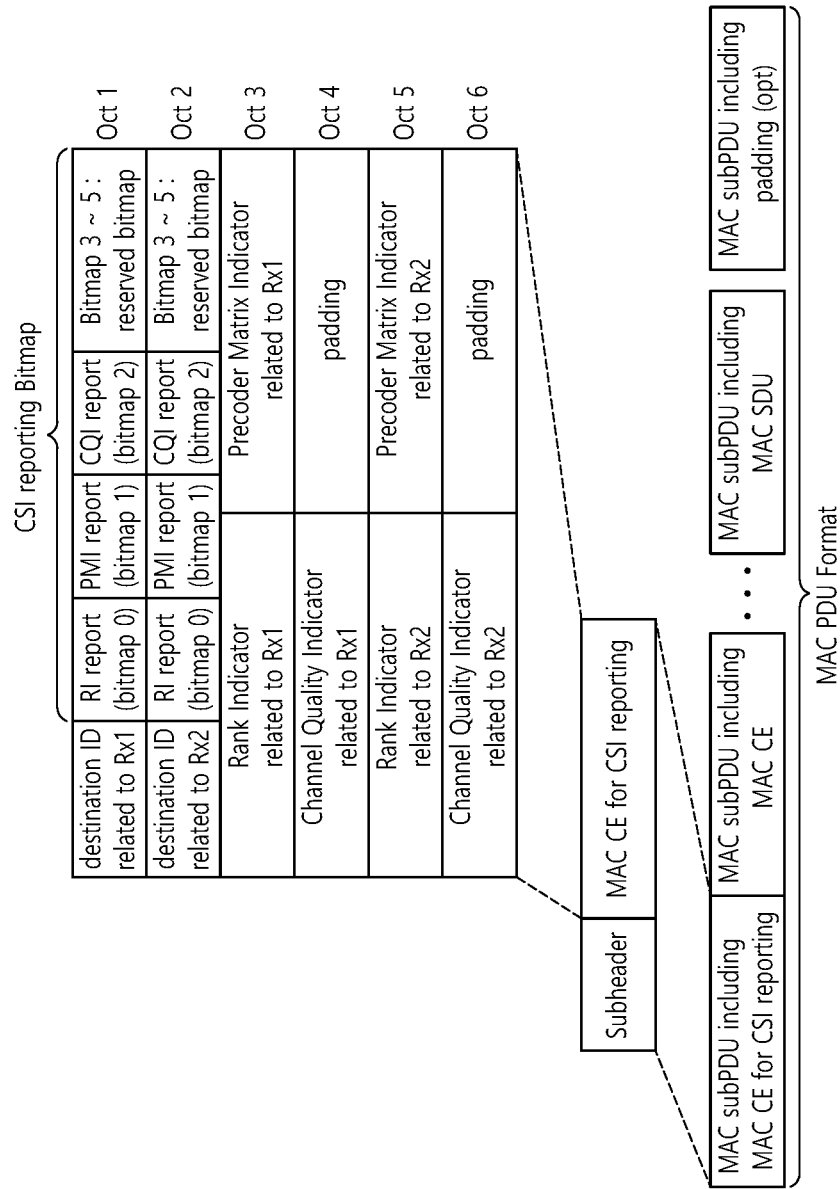
FIG. 17 shows a MAC PDU format for CSI reporting in accordance with an embodiment of the present disclosure.

FIG. 17 shows a MAC PDU format for CSI reporting in accordance with an embodiment of the present disclosure. The embodiment of FIG. 17 may be combined with various embodiments of the present disclosure.

Referring to FIG. 17, for example, each measurement result related to a channel state between a first UE and a plurality of second UEs may be included in Oct3-4 and Oct5-6 of a MAC CE for the CSI reporting, respectively. The measurement result may include at least one of a CQI, a PMI, and/or an RI. Each measurement result related to the channel state between the first UE and the plurality of second UEs may be multiplexed and included in the MAC CE for the CSI reporting. For example, one Oct may include an RI and a PMI related to the first UE and the one second UE. For example, a CQI related to the first UE and the one second UE may be included in one Oct together with padding. For example, a method in which a MAC CE for CSI reporting includes information related to a channel state may be previously configured by a base station to a first UE.

According to an embodiment of the present disclosure, a first UE may report a state of a channel related to sidelink communication between the first UE and a second UE to the base station. For example, the base station may perform an operation related to the sidelink communication of the first UE based on the channel state. For example, based on the channel state, the base station may allocate radio resources related to sidelink communication of the first UE. For example, based on the channel state, the base station may perform link management related to sidelink communication of the first UE. For example, the base station may perform quality of service (QoS) prediction based on the channel state.

Figure 18:
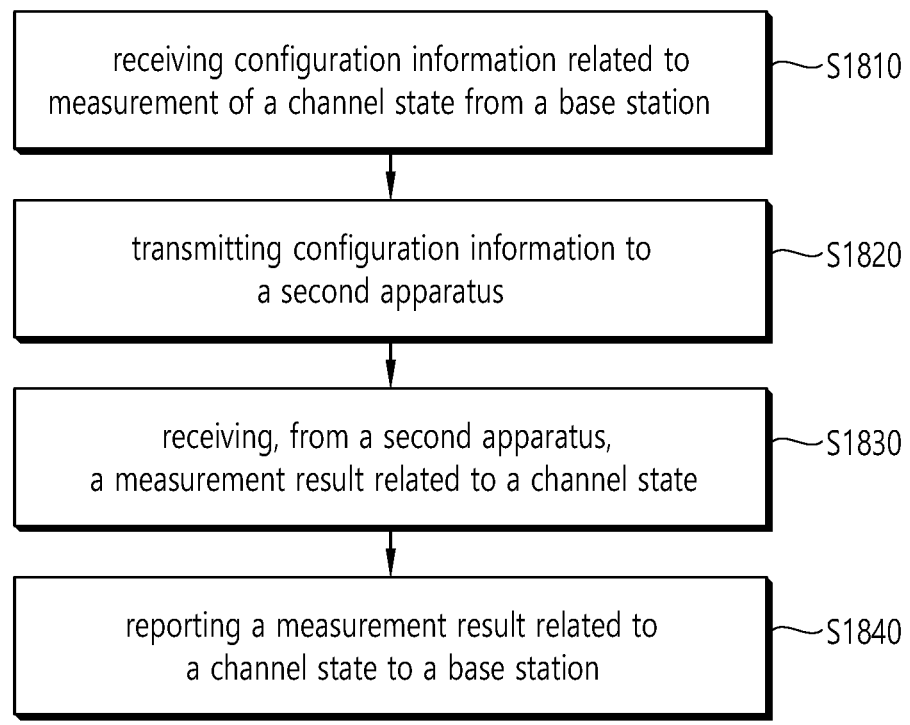
FIG. 18 shows a procedure in which a first apparatus reports a measurement result related to a channel state, in accordance with an embodiment of the present disclosure.

FIG. 18 shows a procedure in which a first apparatus reports a measurement result related to a channel state, in accordance with an embodiment of the present disclosure. The embodiment of FIG. 18 may be combined with various embodiments of the present disclosure.

Referring to FIG. 18, in step S1810, a first apparatus may receive configuration information related to measurement of a channel state from a base station. In step S1820, the first apparatus may transmit the configuration information to a second apparatus. In step S1830, the first apparatus may receive, from the second apparatus, a measurement result related to the channel state. In step S1840, the first apparatus may report the measurement result related to the channel state to the base station. For example, the measurement result may include information related to the second apparatus.

For example, the information related to the second apparatus may include a destination identifier (ID) related to the second apparatus.

For example, the destination ID may be mapped to the measurement result.

For example, the destination ID may be included in a subheader of the medium access control (MAC) sub protocol data unit (PDU) including a MAC control element (CE).

For example, the destination ID may be included in a MAC CE.

For example, the number of destination ID may be one.

For example, the measurement result may be reported through a MAC CE.

For example, the measurement result may include at least one of a channel quality indicator (CQI), a precoding matrix indicator (PMI), or a rank indicator (RI) related to the channel state.

For example, the measurement result may include a bitmap indicating whether at least one of the CQI, the PMI, or the RI is included in a MAC CE.

Additionally, for example, the first apparatus may transmit, to the base station, a request related to granting of a local index related to a connection between the first apparatus and the second apparatus. For example, the first apparatus may receive information related to the local index from the base station. For example, the channel state related to the second apparatus is measured based on a local index and the configuration information. For example, the local index is mapped to the configuration information.

For example, the configuration information may include at least one of a measurement period, a measurement start condition, a type of reference signal (RS), or a type of information related to the channel state. For example, the type of information may include at least one of a CQI, a PMI, or an RI.

For example, the local index may be mapped to at least one of a type of information related to the channel state, a source ID, or a destination ID.

Additionally, for example, the first apparatus may transmit information related to a connection between the first apparatus and the second apparatus to the base station. For example, the information related to the connection may include at least one of a source ID or a destination ID.

The above-described embodiment may be applied to various devices to be described below. For example, a processor 102 of a first apparatus 100 may control a transceiver 106 to receive configuration information related to measurement of a channel state from a second apparatus 200. And, the processor 102 of the first apparatus 100 may control the transceiver 106 to transmit the configuration information to a third apparatus 300. In addition, the processor 102 of the first apparatus 100 may control the transceiver 106 to receive the measurement result related to the channel state. And, the processor 102 of the first apparatus 100 may control the transceiver 106 to report the measurement result related to the channel state to the second apparatus 200.

According to an embodiment of the present disclosure, a first apparatus for performing wireless communication may be proposed. For example, the first apparatus may comprise one or more memories storing instructions; one or more transceivers; and one or more processors connected to the one or more memories and the one or more transceivers. For example, the one or more processors may execute the instructions to: receive configuration information related to measurement of a channel state from a base station; transmit the configuration information to a second apparatus; receive, from the second apparatus, a measurement result related to the channel state; and report the measurement result related to the channel state to the base station. For example, the channel state may be measured based on the configuration information. For example, the measurement result may include information related to the second apparatus.

According to an embodiment of the present disclosure, an apparatus configured to control a first user equipment (UE) may be proposed. For example, the apparatus may comprise: one or more processors; and one or more memories operably connected to the one or more processors and storing instructions. For example, the one or more processors may execute the instructions to: receive configuration information related to measurement of a channel state from a base station; transmit the configuration information to a second UE; receive, from the second UE, a measurement result related to the channel state; and report the measurement result related to the channel state to the base station. For example, the channel state may be measured based on the configuration information. For example, the measurement result may include information related to the second UE.

According to an embodiment of the present disclosure, a non-transitory computer-readable storage medium storing instructions may be proposed. For example, when executed by one or more processors, the instructions may cause the one or more processors to: receive configuration information related to measurement of the channel state from a base station; transmit the configuration information to a second apparatus; receive, from the second apparatus, a measurement result related to the channel state; and report the measurement result related to the channel state to the base station. For example, the channel state may be measured based on the configuration information. For example, the measurement result may include information related to the second apparatus.

Figure 19:
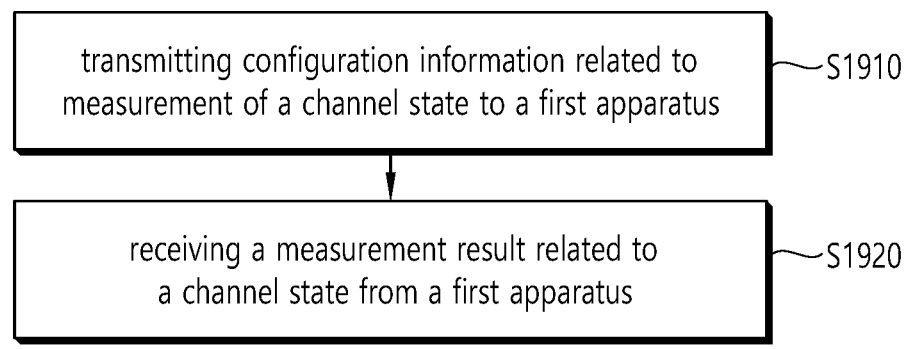
FIG. 19 shows a procedure in which a base station receives a measurement result related to a channel state in accordance with an embodiment of the present disclosure.

FIG. 19 shows a procedure in which a base station receives a measurement result related to a channel state in accordance with an embodiment of the present disclosure. The embodiment of FIG. 19 may be combined with various embodiments of the present disclosure.

Referring to FIG. 19, in step S1910, a base station may transmit configuration information related to measurement of a channel state to a first apparatus. In step S1920, the base station may receive a measurement result related to the channel state from the first apparatus. For example, the measurement result may include information related to a second apparatus, the information related to the second apparatus may include a destination identifier (ID), the destination ID may be mapped to the measurement result.

Additionally, for example, the base station may receive, from the first apparatus, a request related to granting of a local index related to a connection between the first apparatus and the second apparatus; assign the local index; and transmit information related to the local index to the first apparatus. For example, the channel state related to the second apparatus may be measured based on the local index and the configuration information, and the local index may be mapped to at least one of the configuration information, a type of information related to the channel state, a source ID, the destination ID.

The above-described embodiment may be applied to various devices to be described below. For example, a processor 202 of a second apparatus 200 may control a transceiver 206 to transmit configuration information related to measurement of a channel state to a first apparatus 100. And, the processor 202 of the second apparatus 200 may control the transceiver 206 to receive the measurement result related to the channel state from the first apparatus 100.

According to an embodiment of the present disclosure, a base station for performing wireless communication may be proposed. For example, the base station may comprise: one or more memories storing instructions; one or more transceivers; and one or more processors connected to the one or more memories and the one or more transceivers. For example, the one or more processors may execute the instructions to: transmit configuration information related to measurement of a channel state to a first apparatus; and receive a measurement result related to the channel state from the first apparatus. For example, the measurement result may include information related to a second apparatus, the information related to the second apparatus may include a destination identifier (ID), and the destination ID may be mapped to the measurement result.

Additionally, for example, the base station may receive, from the first apparatus, a request related to granting of a local index related to a connection between the first apparatus and the second apparatus; assign the local index; and transmit information related to the local index to the first apparatus. For example, the channel state related to the second apparatus may be measured based on the local index and the configuration information, and the local index may be mapped to at least one of the configuration information, a type of information related to the channel state, a source ID, the destination ID.

According to an embodiment of the present disclosure, a base station may more strictly manage the channel state between UEs performing sidelink communication.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
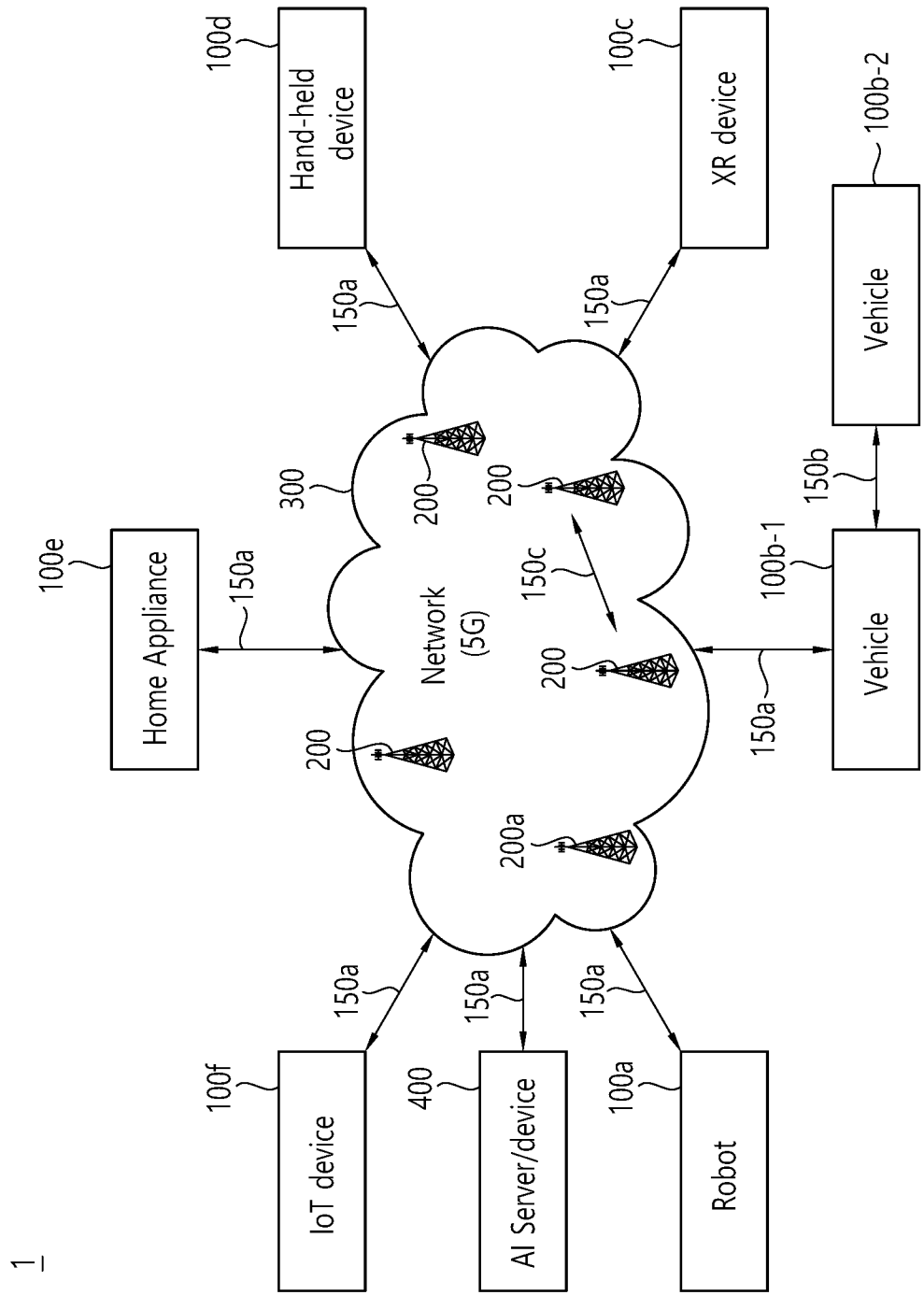
FIG. 20 shows a communication system 1, in accordance with an embodiment of the present disclosure.

FIG. 20 shows a communication system 1, in accordance with an embodiment of the present disclosure.

Referring to FIG. 20, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 21:
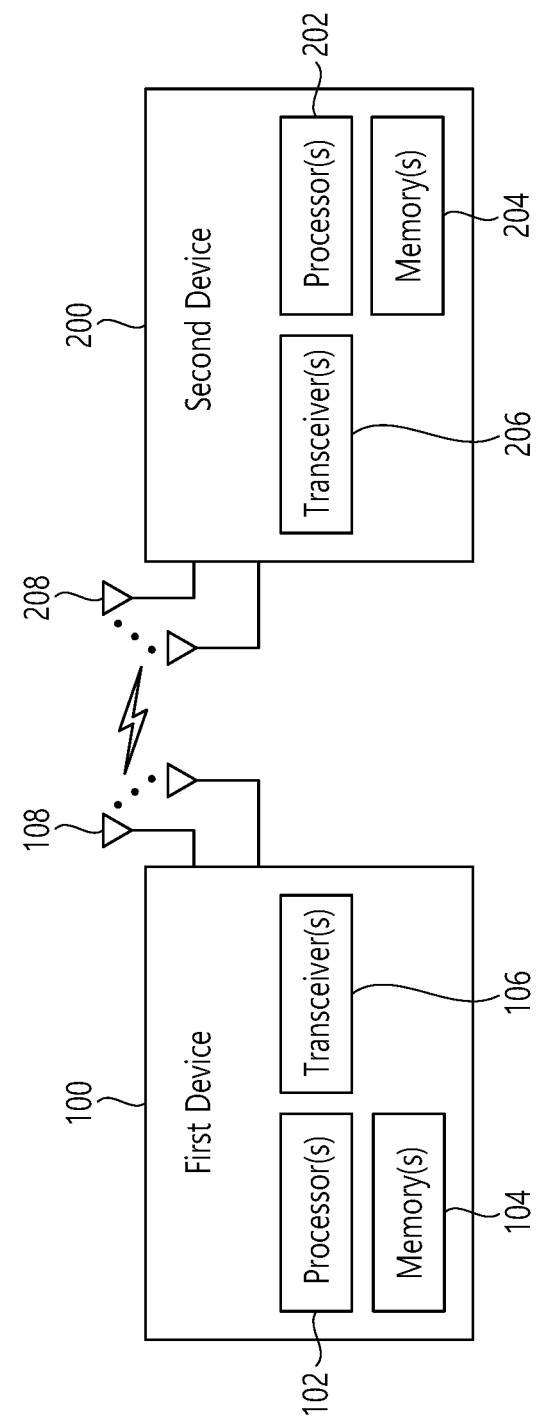
FIG. 21 shows wireless devices, in accordance with an embodiment of the present disclosure.

FIG. 21 shows wireless devices, in accordance with an embodiment of the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 22:
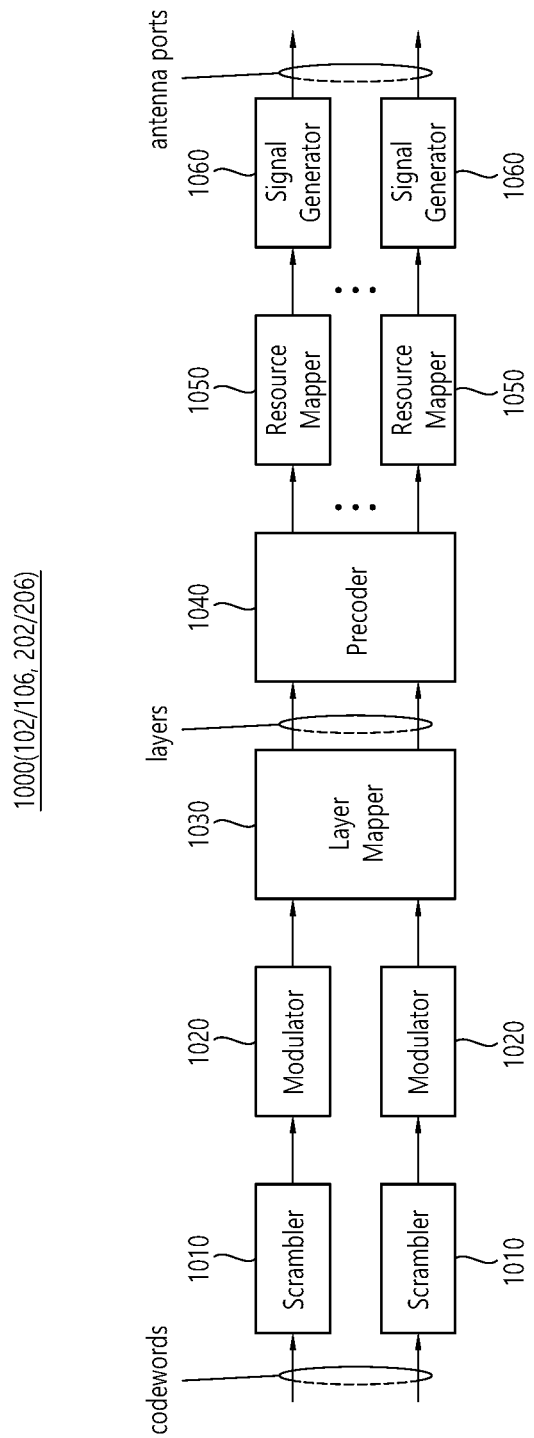
FIG. 22 shows a signal process circuit for a transmission signal, in accordance with an embodiment of the present disclosure.

FIG. 22 shows a signal process circuit for a transmission signal, in accordance with an embodiment of the present disclosure.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 23:
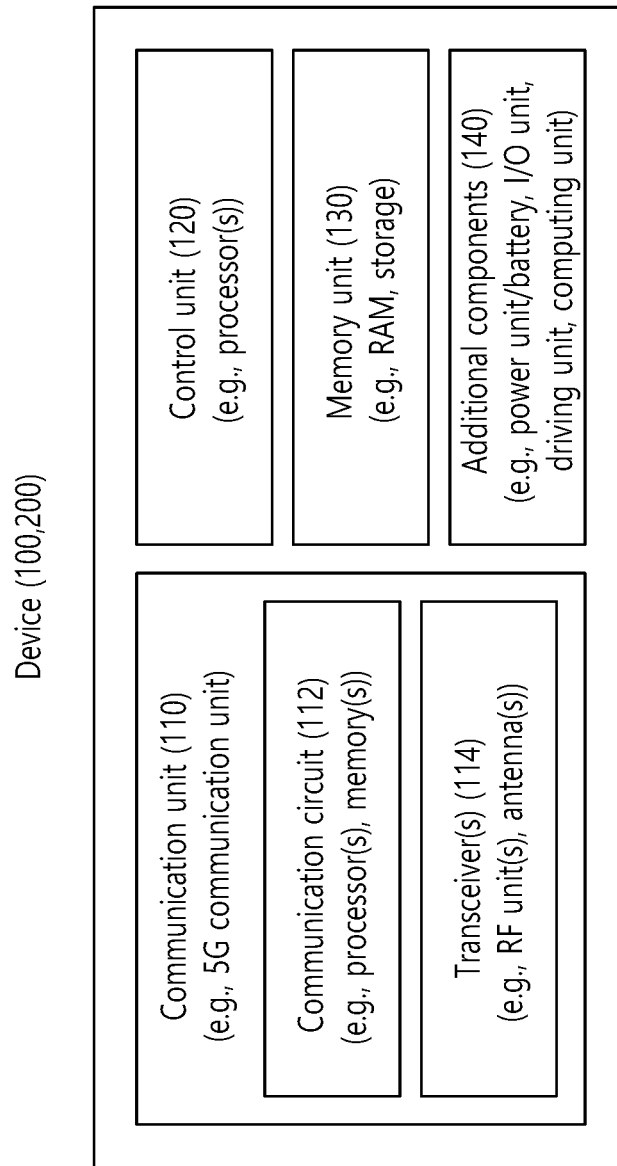
FIG. 23 shows another example of a wireless device, in accordance with an embodiment of the present disclosure.

FIG. 23 shows another example of a wireless device, in accordance with an embodiment of the present disclosure. The wireless device may be implemented in various forms according to a use-case/service (refer to FIG. 20).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Figure 24:
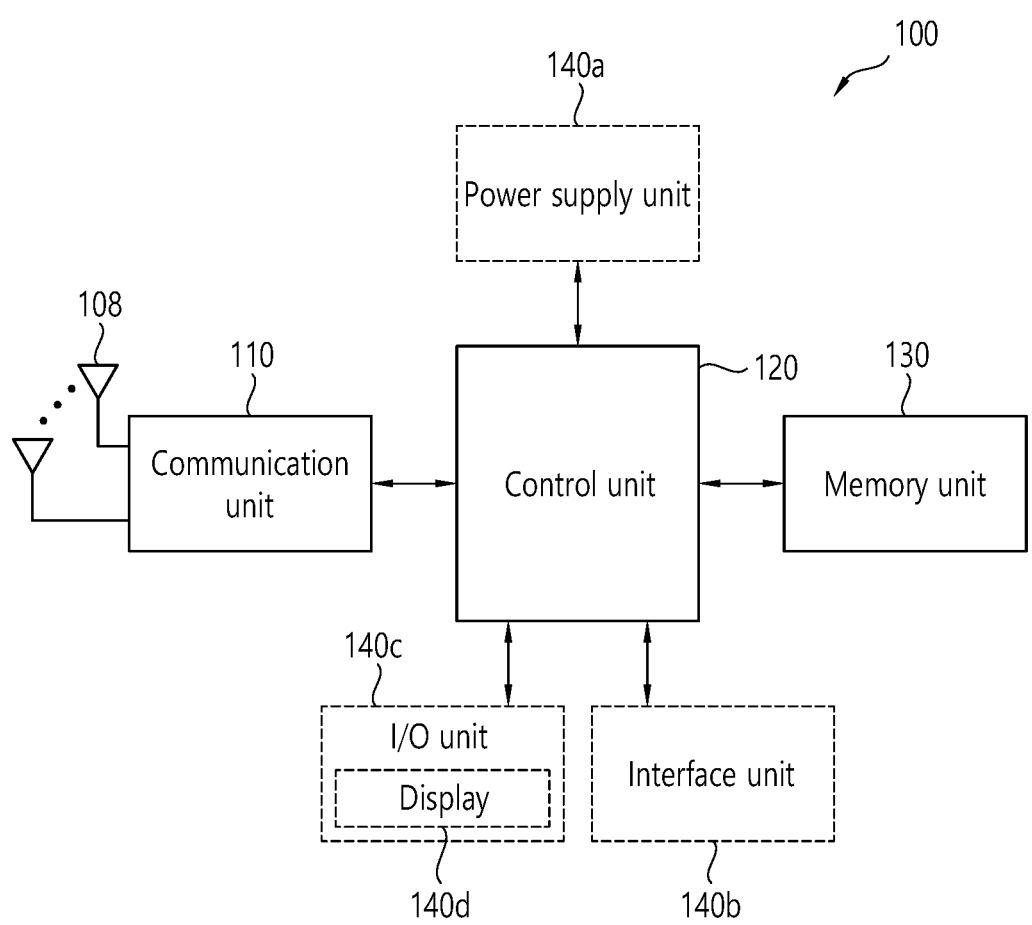
FIG. 24 shows a hand-held device, in accordance with an embodiment of the present disclosure.

FIG. 24 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 25:
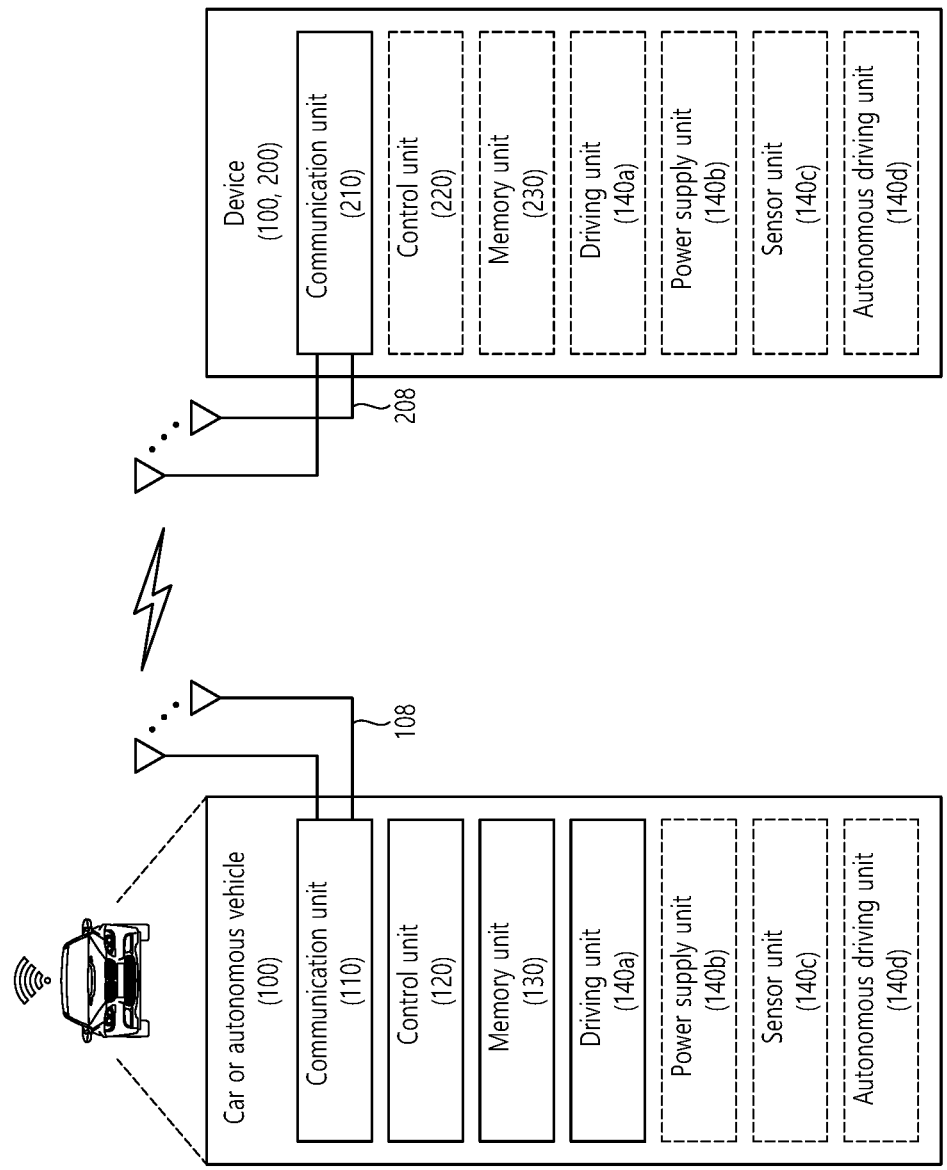
FIG. 25 shows a vehicle or an autonomous vehicle, in accordance with an embodiment of the present disclosure.

FIG. 25 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 25, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a first apparatus configured to operate in a wireless communication system, the method comprising:
   receiving configuration information related to measurement of a channel state from a base station;
   transmitting, to the base station, a request related to granting of a local index related to a connection between the first apparatus and a second apparatus; and
   receiving information related to the local index from the base station,
   wherein a channel state related to the second apparatus is measured based on the local index and the configuration information, and
   wherein the local index is mapped to the configuration information.

2. The method of claim 1, further comprising:
   receiving, from the second apparatus, a measurement result related to a channel state,
   wherein the measurement result includes information related to the second apparatus, and
   wherein the information related to the second apparatus includes a a destination identifier (ID) related to the second apparatus.

3. The method of claim 2, wherein the destination ID is mapped to the measurement result.

4. The method of claim 2, wherein the destination ID is included in a media access control (MAC) control element (CE).

5. The method of claim 1, wherein the measurement result includes a bitmap indicating whether at least one of a channel quality indicator (CQI), or a rank indicator (RI) is included in a media access control (MAC) control element (CE).

6. The method of claim 1,
wherein the configuration information includes at least one of a measurement period, a measurement start condition, a type of reference signal (RS), or a type of information related to the channel state, and
wherein the type of information includes at least one of a channel quality indicator (CQI), or a rank indicator (RI).

7. The method of claim 1, wherein the local index is mapped to at least one of a type of information related to the channel state, a source identifier (ID), or a destination ID.

8. The method of claim 1, further comprising:
transmitting information related to a connection between the first apparatus and the second apparatus to the base station;
wherein the information related to the connection includes at least one of a source identifier (ID), or a destination ID.

9. A first apparatus for performing wireless communication, the first apparatus comprising:
one or more memories storing instructions;
one or more transceivers; and
one or more processors connected to the one or more memories and the one or more transceivers, wherein the one or more processors execute the instructions to perform operations comprising:
receiving configuration information related to measurement of a channel state from a base station;
transmitting, to the base station, a request related to granting of a local index related to a connection between the first apparatus and a second apparatus; and
receiving information related to the local index from the base station,
wherein a channel state related to the second apparatus is measured based on the local index and the configuration information, and
wherein the local index is mapped to the configuration information.

10. An apparatus configured to control a first user equipment (UE), the apparatus comprising:
one or more processors; and
one or more memories operably connected to the one or more processors and storing instructions, wherein the one or more processors execute the instructions to perform operations comprising:
receiving configuration information related to measurement of a channel state from a base station;
transmitting, to the base station, a request related to granting of a local index related to a connection between the first UE and a second UE; and
receiving information related to the local index from the base station,
wherein a channel state related to the second UE is measured based on the local index and the configuration information, and
wherein the local index is mapped to the configuration information.

* * * * *